United States Patent
Zhu et al.

(10) Patent No.: US 8,345,944 B2
(45) Date of Patent: *Jan. 1, 2013

(54) SYSTEM AND METHOD FOR CORONARY DIGITAL SUBTRACTION ANGIOGRAPHY

(75) Inventors: Ying Zhu, Monmouth Junction, NJ (US); Simone Prummer, Neunkirchen am Brand (DE); Terrence Chen, Princeton, NJ (US); Martin Ostermeier, Buckenhof (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 772 days.

This patent is subject to a terminal disclaimer.

(21) Appl. No.: 12/509,514

(22) Filed: Jul. 27, 2009

(65) Prior Publication Data

US 2010/0034446 A1     Feb. 11, 2010

Related U.S. Application Data

(60) Provisional application No. 61/086,505, filed on Aug. 6, 2008.

(51) Int. Cl.
    *G06K 9/00*     (2006.01)

(52) U.S. Cl. ...... 382/130; 382/131; 382/132; 378/98.12

(58) Field of Classification Search .................... 382/130
See application file for complete search history.

(56) References Cited

U.S. PATENT DOCUMENTS

| | | | |
|---|---|---|---|
| 5,557,684 A | | 9/1996 | Wang et al. |
| 5,647,360 A | * | 7/1997 | Bani-Hashemi et al. ..... 600/425 |
| 6,154,518 A | * | 11/2000 | Gupta ............................. 378/62 |
| 6,826,292 B1 | | 11/2004 | Tao et al. |
| 6,987,865 B1 | | 1/2006 | Szeliski et al. |
| 7,155,032 B2 | | 12/2006 | Szeliski et al. |
| 7,551,721 B2 | * | 6/2009 | Nakaura et al. ............ 378/98.12 |
| 7,583,831 B2 | * | 9/2009 | Tu et al. ........................ 382/131 |
| 7,817,834 B2 | * | 10/2010 | Bernhardt et al. ............ 382/129 |
| 7,826,884 B2 | * | 11/2010 | Baumgart ..................... 600/407 |
| 7,940,971 B2 | * | 5/2011 | Zhang et al. .................. 382/128 |
| 2006/0285747 A1 | | 12/2006 | Blake et al. |
| 2007/0116356 A1 | | 5/2007 | Gong et al. |
| 2009/0010512 A1 | | 1/2009 | Zhu et al. |
| 2009/0080729 A1 | | 3/2009 | Zhang et al. |

OTHER PUBLICATIONS

Barbu, A., et al., "Hierarchical Learning of Curves Application to Guidewire Localization in Fluoroscopy", IEEE Int'l. Conf. Comp. Vision and Pattern Rec., 2007.
Coleman, T. F., et al., "A Reflective Newton Method for Minimizing a Quadractic Function Subject to Bounds on some of the Variables", SIAM Journal on Optimization, 1996.

(Continued)

*Primary Examiner* — Lena Najarian (57) ABSTRACT

A method and system for extracting coronary vessels fluoroscopic image sequences using coronary digital subtraction angiography (DSA) are disclosed. A set of mask images of a coronary region is received, and a sequence of contrast images for the coronary region is received. For each contrast image, vessel regions are detected in the contrast image using learning-based vessel segment detection and a background region of the contrast image is determined based on the detected vessel regions. Background motion is estimated between one of the mask images and the background region of the contrast image by estimating a motion field between the mask image and the background image and performing covariance-based filtering over the estimated motion field. The mask image is then warped based on the estimated background motion to generate an estimated background layer. The estimated background layer is subtracted from the contrast image to extract a coronary vessel layer for the contrast image.

27 Claims, 6 Drawing Sheets

OTHER PUBLICATIONS

Comaniciu, D., "Nonparametric Information Fusion for Motion Estimation", IEEE Conf. Comp. and Pattern Rec., 2003.

Freeman, W.T., et al., "The Design and Use of Steerable Filters", IEEE Transactions on Pattern Analysis and Machine Intelligence, 1991.

Tu, Z., "Probabilistic Boosting-Tree: Learning Discriminative Models for Classification, Recognition, and Clustering", IEEE Int'l. Conf. Comp. Vision, 2006.

* cited by examiner

SYSTEM AND METHOD FOR CORONARY DIGITAL SUBTRACTION ANGIOGRAPHY

This application claims the benefit of U.S. Provisional Application No. 61/086,505, filed Aug. 6, 2008, the disclosure of which is herein incorporated by reference.

BACKGROUND OF THE INVENTION

The present invention relates to fluoroscopic image sequences, and more particularly to detecting coronary vessel layers from fluoroscopic image sequences.

Angiography is a medical imaging technique in which X-ray images are used to visualize internal blood filled structures, such as arteries, veins, and the heart chambers. Since blood has the same radiodensity as the surrounding tissues, these blood-filled structures cannot be differentiated from the surrounding tissue using conventional radiology. Thus, in angiography, a contrast agent is added to the blood, usually via a catheter, to make the blood vessels visible via X-ray. In many angiography procedures, X-ray images are taken over a period of time, which results in a sequence of fluoroscopic images, which show the motion of the blood over the period of time. Such fluoroscopic image sequences contain useful information that can be difficult to decipher due to the collapsing of 3-dimensional information into the 2-dimensional images.

In traditional computer imaging problems of motion estimation, occlusion handling or motion segmentation are typically the main concerns. Accordingly, traditional techniques for extracting objects of interest from image sequences typically use intensity based approaches to differentiate between objects in the image sequences. However, such traditional techniques can yield erroneous results in medical image sequences, such as fluoroscopic image sequences, which are generated using the phenomenon of transparency. Since various internal structures have different levels of transparency in the fluoroscopic images, these structures can overlap, and it may be difficult to accurately distinguish between these structures in the fluoroscopic image sequences using the traditional intensity based approaches.

BRIEF SUMMARY OF THE INVENTION

The present invention provides a method and system for extracting coronary vessels from fluoroscopic image sequences using coronary digital subtraction angiography (DSA).

In one embodiment of the present invention, a set of mask images is received. The set of mask images is a sequence of fluoroscopic images of a coronary region taken over at least one full cardiac cycle with no contrast medium injected into the vessels. A sequence of contrast images is then received. The contrast images are fluoroscopic images of the coronary region with a contrast medium injected into the coronary vessels. For each contrast image, approximate vessel regions are detected in the contrast image using learning-based vessel segment detection and a background region of the contrast image is determined based on the detected vessel regions. Background motion is estimated between every mask image and the background region of the contrast image by estimating a motion field between the mask image and the background image and performing covariance-based filtering over the estimated motion field. The mask image is then warped based on the estimated background motion to generate an estimated background layer. One of the mask images that generate the estimated background layer that best matches the background region of the contrast image is selected. The estimated background layer is subtracted from the contrast image to extract a coronary vessel layer for the contrast image.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for detecting coronary vessels from fluoroscopic images. Embodiments of the present invention are described herein to give a visual understanding of the coronary vessel extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Digital subtraction angiography (DSA) is a technique for visualizing blood vessels in the human body. In DSA, a sequence of fluoroscopic images, referred to as contrast images, is acquired to show the passage of contrast medium that is injected into the vessel of interest. A sequence of fluoroscopic images contains multiple 2D X-ray images obtained in real time. The X-ray images record a certain field of view of a time period. Accordingly, motion of objects within the field of view can be observed in a sequence of fluoroscopic images. The background structures are largely removed from the contrast images by subtracting a mask image, which is an image acquired before contrast injection. However, the appearance of background structures in a contrast image and a mask image can differ due to fluctuation of radiation, acquisition noise, and patient motion. In traditional DSA where the mask image is directly subtracted from the contrast image, the difference between the background structures in the contrast images and the mask image can cause errors in detecting the blood vessels.

The main cause of differences in the appearance of background structures in a contrast image and a mask image is patient motion. Motion correction for DSA can involve various techniques for image motion estimation, where the motion between a contrast image and a mask image is obtained by warping one image to match the other. Commonly used matching criteria for motion estimation include optimization of various similarity or error measures, such as normalized cross-correlation, sum of absolute values of differences, variance of differences, etc. In the case of coronary DSA, cardiac motion causes more severe differences between contrast images and mask images. Furthermore, because of the complexity of cardiac motion, the commonly used matching criteria are often violated in image regions of coronary vessels, making it more difficult to estimate the background motion around coronary vessels in coronary DSA.

Embodiments of the present invention provide a viable approach to coronary DSA that combines robust motion estimation and learning-based object detection to achieve fully automatic and real-time coronary vessel subtraction. Embodiments of the present invention formulate coronary DSA as a problem to remove dynamic background structures from a contrast image. Pixel values in X-ray images are determined by the energy flux incident on the detector, which is commonly described as an exponential attenuation function as the X-ray beams pass through the layers of tissue. As a result, X-ray images are often dealt with in the logarithmic space and modeled as a linear superposition of multiple layers. In the case of coronary DSA, in an advantageous implementation of the present invention, only two layers are considered, a coronary layer and a background layer. The coronary layer is defined as a transparent image layer including coronary arteries filled with contrast medium. The background layer is defined as a transparent layer including background structures. A contrast image in a fluoroscopic sequence is denoted herein as $I_t(x)$, its coronary layer is denoted as $I_{C,t}(x)$, and it background layer is denoted as $I_{B,t}(x)$, where t is a time index and x is a pixel location. The formulation of layer composition after logarithmic post-processing can be expressed as:

$$I_t(x) = I_{C,t}(x) + I_{B,t}(x). \quad (1)$$

The goal of coronary DSA is to remove the background layer to extract the coronary arteries while both layers are undergoing cardiac and respiratory motion.

Figure 1:
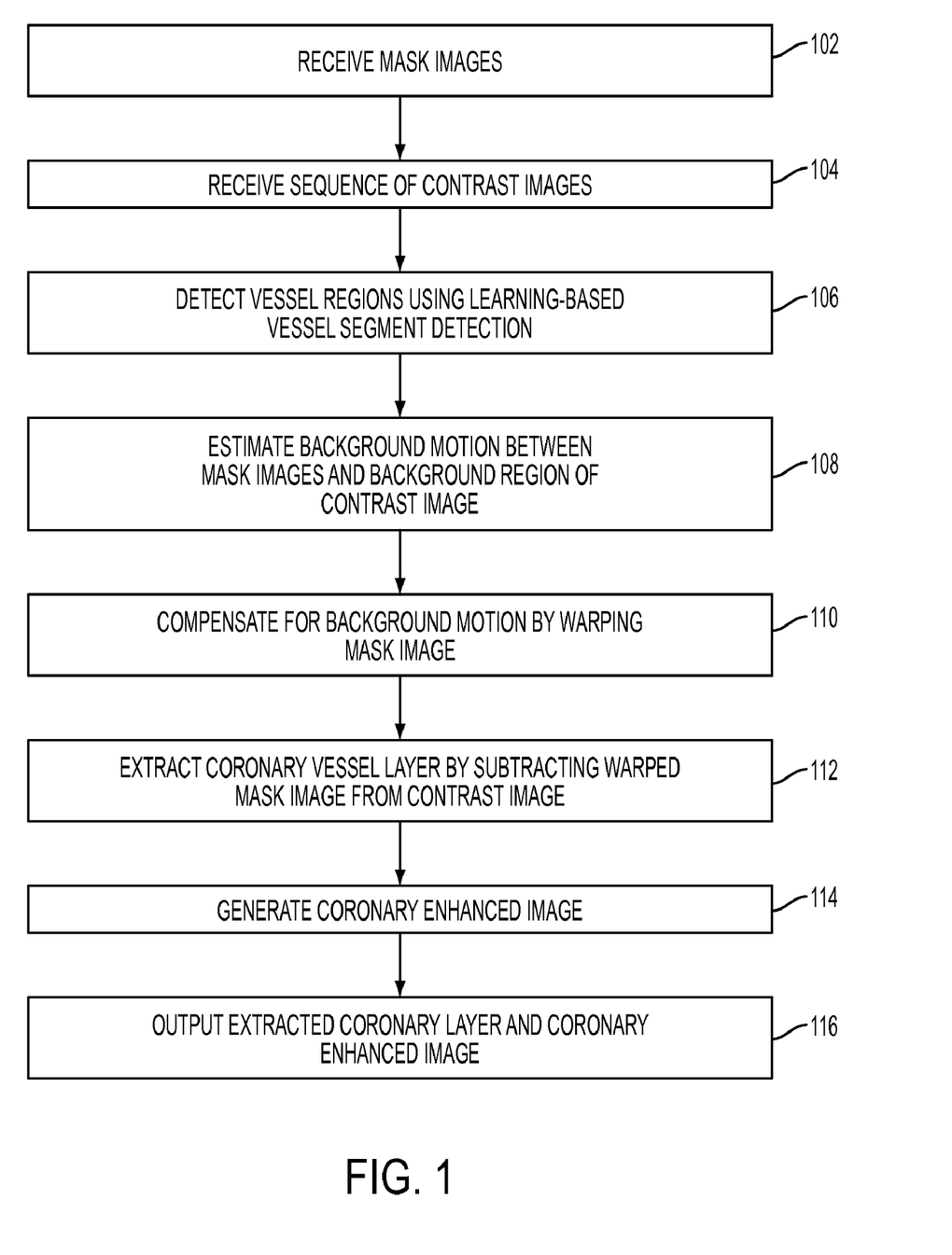
FIG. 1 illustrates a method for extracting coronary vessels from a fluoroscopic image sequence using coronary digital subtraction angiography (DSA)
Figure 2:
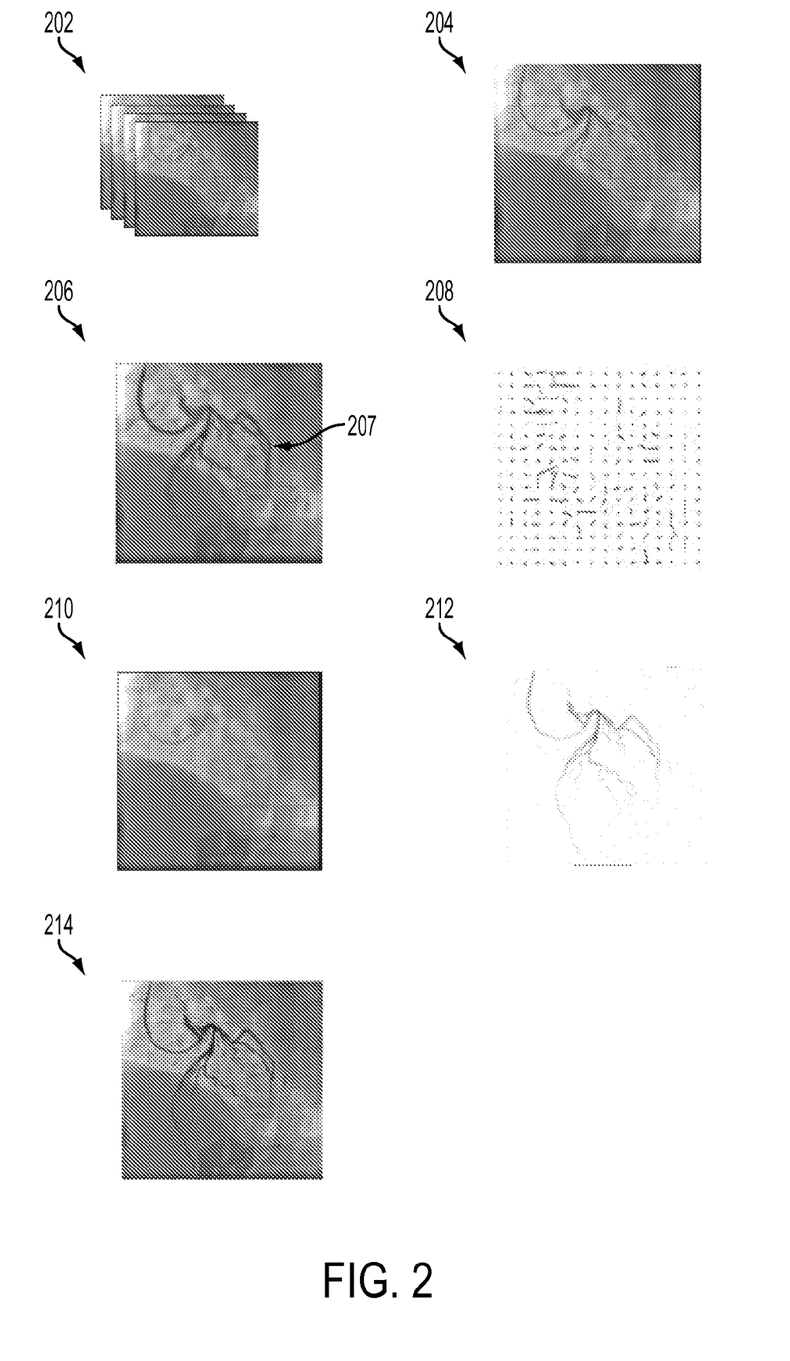
FIG. 2 illustrates exemplary images resulting from the steps of the method of FIG. 1.

FIG. 1 illustrates a method for extracting coronary vessels from a fluoroscopic image sequence using coronary DSA. The method of FIG. 1 utilizes learning-based object detection to facilitate the estimation of background motion. FIG. 2 illustrates exemplary images resulting from the steps of the method of FIG. 1. The images of FIG. 2 are referred to below while describing the method steps of FIG. 1.

At step 102, multiple mask images are received. The mask images are fluoroscopic or X-ray images of a coronary region of a patient without any contrast agent injected into the coronary vessels. The mask images are a sequence taken over the course of at least one cardiac cycle (heartbeat). Accordingly, the cardiac motion over the course of a full cardiac cycle is implicitly embedded in the set of mask images, such that background structures in various cardiac phases are captured in the set of mask images. The mask images can be received by acquiring the mask images directly from an X-ray scanning device. It is also possible that the mask images can be received by loading mask images that were previously acquired images and stored, for example, on a computer readable medium or storage of a computer system. When the set of mask images is received, the mask images are stored on a memory or storage of a computer system that is implementing the method of FIG. 1. As illustrated in FIG. 2, images 202 show a set of mask images.

At step 104, a sequence of contrast images is received. The sequence of contrast images can be electronic data representing fluoroscopic or X-ray images resulting from an X-ray procedure, such as an angiograph, in which a contrast agent is injected into the coronary vessels. The sequence of contrast images are images of the coronary region taken at a regular interval over a time frame. Each image in the sequence can be referred to as a frame. The contrast images can be received directly from an X-ray scanning device, or previously stored contrast images can be loaded. The sequence of contrast images are processed frame by frame to independently extract the coronary vessels for each contrast image in the sequence. Accordingly, steps 106-116 of FIG. 1 are performed independently for each contrast image in the sequence. These steps can be automatically performed for each contrast image in real-time as each contrast image in the sequence is received. Image 204 of FIG. 2 shows an exemplary contrast image.

At step 106, vessel regions in the contrast image are detected using learning-based vessel segment detection. In order to detect vessel regions in the contrast image, a vessel segment detector can be implemented using a binary classifier that separated the class of vessel images from the class of non-vessel images. The binary classifier is learned from a set of vessel images and non-vessel images using a probabilistic boosting tree (PBT) algorithm. To prepare a set of training samples, coronary vessels are manually annotated in a number of contrast images, local image patches containing the annotated vessels are used as the positive set of training samples, and patches away from the vessels are used as the negative training samples. The PBT algorithm learns a binary decision tree, where each node of the tree is a binary classifier by itself and is learned using the Adaboost algorithm. An extended set of Haar features can be used for training the boosted classifiers.

Figure 4:
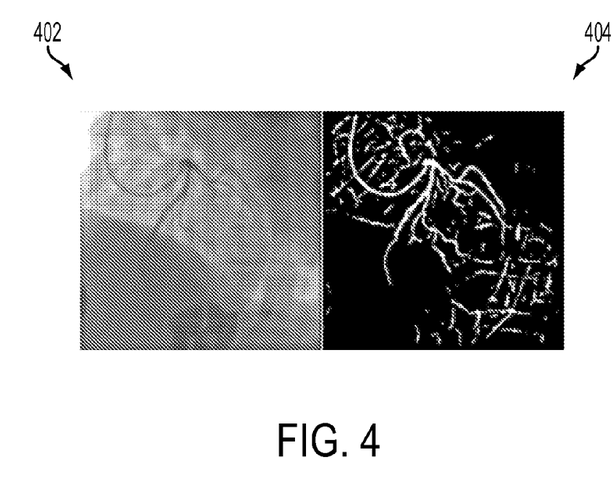
FIG. 4 illustrates ridge features extracted using steerable filters for an exemplary contrast image.

Given an image patch $I_{patch}$, the trained binary classifier calculates the posterior probability that a vessel segment appears in this image patch $p(vessel|I_{patch})$. A detected vessel region can be defined as the image area where vessel segments are detected with high probabilities (i.e., greater than a certain threshold). The remaining area of the image includes primarily background structures and is defined as the background region. To detect vessel segments with different thicknesses, the contrast image can be rescaled several times to generate a coarse-to-fine image pyramid, and the vessel segmentation detection can be performed at multiple scales. At each scale, in order to speed up vessel detection for a contrast image, it is possible to apply a set of efficient steerable filters to identify ridge features and their different orientations in the contrast image, and then perform the vessel detection using the binary classifier only at the ridge features. FIG. 4 illustrates ridge features extracted using steerable filters for an exemplary contrast image. As illustrated in FIG. 4, image 402 is an exemplary contrast image, and image 404 shows ridge features extracted from contrast image 402 using a set of steerable filters. Accordingly, in order to detect the vessel regions of contrast image 402, it is possible to perform vessel detection using the binary classifier only on the ridge features shown in image 404.

Figure 3:
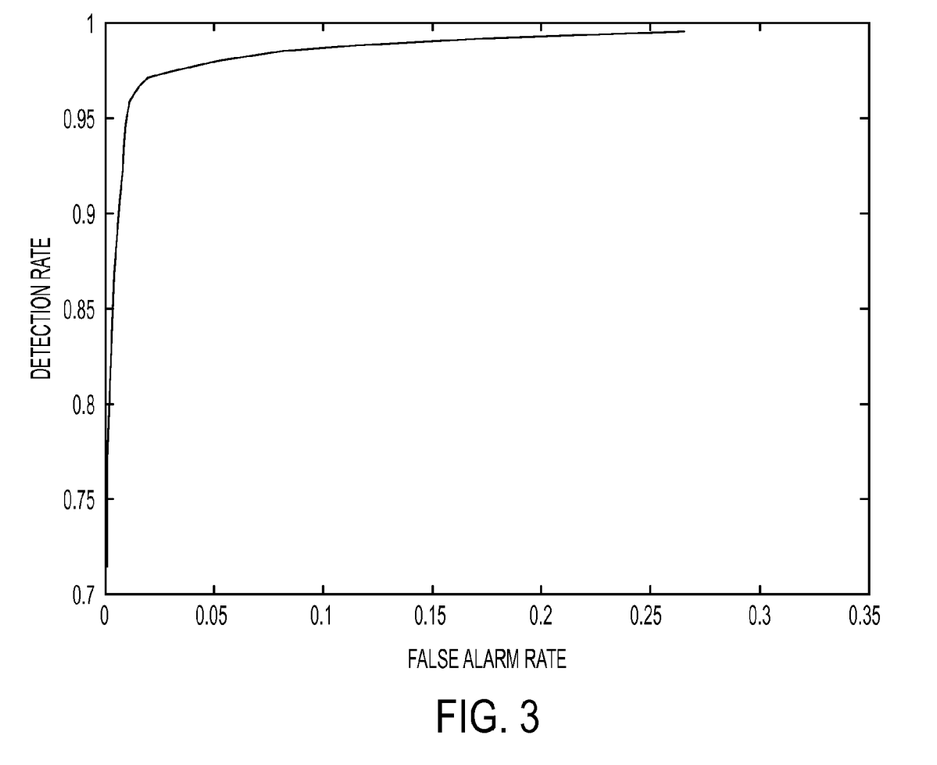
FIG. 3 illustrates Receiver Operation Characteristics (ROC) of an exemplary binary classifier.

Image 206 of FIG. 2 illustrates vessel regions 207 detected in the contrast image 204 using an exemplary binary classifier. The exemplary binary classifier used to detect the vessel regions 207 was trained using 1199575 examples of vessel image patches and 172544 examples of non-vessel image patches. FIG. 3 illustrates the Receiver Operation Characteristics (ROC) of the exemplary binary classifier.

To speed up the process of vessel segment detection, ridge-like image structures are first located in the contrast image through the use of steerable filters, as described above and illustrated in FIG. 4, and the vessel segment detector is applied only to the image areas where ridge-like structures are present.

Returning to FIG. 1, at step 108, background motion is estimated between each of the mask images and the background region of the contrast image. As described above, the background region $\Omega^C$ of the contrast image is obtained by excluding the detected vessel regions $\Omega$ from the original contrast image. The background region $\Omega^C$ of the contrast image is then compared to each of the mask images in order to determine background motion between the background region $\Omega^C$ and each mask image and select one of the mask images that best matches the background region $\Omega^C$ of the contrast image. The best mask image can be selected using an optimal matching criterion for motion estimation. In order to select the best mask image, a dense motion field is estimated between each mask image and the background region of the contrast image. The mask images are warped according to the estimated motion field to match the background region of the contrast image. The best mask image is selected such that the mean-squared-error between its warped image and the background region of the contrast image is minimum. Since the set of mask images represent a full cardiac cycle, the selected mask image is the mask image obtained at the most similar point in the cardiac cycle as the contrast image.

Effective motion compensation is critical for coronary DSA. In particular there is a mixture of cardiac and respiratory motion between the mask image $I_m$ and the contrast image $I_t$. Accurate parametric methods are often difficult to obtain for such complex motion. Instead, embodiments of the present invention resort to nonparametric estimation of a dense motion field $v(x)$ from the image data. In order to achieve robust motion estimation with sub-pixel accuracy, the present invention modify the well-known Lucas-Kanade algorithm with an additional step of convariance-based fusion to smooth motion estimation, and propose a new motion estimation technique referred to herein as Lucas-Kanade-Fusion (LKF).

As described above, the background region $\Omega_t$ of the contrast image $I_t$ is determined by subtracting the detected vessel segments from $I_t$. For a pixel $x \in \Omega_t$, the goal is to find the corresponding displacement vector $v(x)$ such that $I_t$ matches $I_m(x+v(x))$. During breathing and cardiac movements, different layers of tissues and bone structures undergo different motion. This leads to multiple layers of transparent motion in their 2D projection. Thus, strictly speaking, a perfect matching of coronary images acquired at different times, i.e., $I_t(x) = I_m(x+v(x))$, does not exist within a single layer of motion. However, instead of attempting to recover the true motion, embodiments of the present invention eliminate background structures through motion compensation. For this purpose, the major motion at each location $x \in \Omega_t$ that accounts for the most significant mismatch between $I_t(x)$ and $I_m(x)$ is estimated.

The Lucas-Kanade algorithm assumes that the unknown displacement $v(x)$ is constant within a local neighborhood $R(x) = \{x_i: i=1, \ldots, n\}$ of $x$, and the displacement vector is calculated by minimizing the following error function:

$$\sum_{x_i \in R(x)} (I_t(x_i) - I_m(x_i+v))^2. \tag{2}$$

In an iterative procedure, incremental motion $\delta v = [\delta v_x, \delta v_y]^T$ is solved through linear equations after applying Taylor expansion:

$$\begin{bmatrix} \sum_{x_i} [\partial_x I_{m,w}(x_i)]^2 & \sum_{x_i} \partial_x I_{m,w}(x_i) \cdot \partial_y I_{m,w}(x_i) \\ \sum_{x_1} \partial_x I_{m,w}(x_i) \cdot \partial_y I_{m,w}(x_i) & \sum_{x_1} [\partial_y I_{m,w}(x_i)]^2 \end{bmatrix} \begin{bmatrix} \delta v_x \\ \delta v_y \end{bmatrix} = \tag{3}$$

$$\begin{bmatrix} \sum_{x_i} \partial_x I_{m,w}(x)(I_t(x_i) - I_{m,w}(x_i)) \\ \sum_{x_i} \partial_y I_{m,w}(x)(I_t(x_i) - I_{m,w}(x_i)) \end{bmatrix},$$

where $I_{m,w}(x) = I_m(x+v(x))$ is the warped image of $I_m$. The solution to Equation (3) can be expressed as:

$$\widehat{\delta v}(x) = (A^T A)^{-1} A^T b \tag{4}$$

$$\text{where } A = \begin{bmatrix} \nabla_x I_{m,w}(x_1) \\ \vdots \\ \nabla_x I_{m,w}(x_n) \end{bmatrix} \; b = \begin{bmatrix} I_t(x_l) - I_{m,w}(x_1) \\ \vdots \\ I_t(x_n) - I_{m,w}(x_n) \end{bmatrix},$$

and $\nabla_x I = [\delta_x I, \delta_y I]$ is the image gradients. The Lucas-Kanade algorithm calculates the displacement vector $\delta v$ from a local neighborhood. However, one issue with this solution is that the confidence of this calculation is not taken into account. In homogeneous image regions, the solution becomes degenerate due to lack of textures, which is not unusual in coronary fluoroscopic images.

According to an advantageous embodiment of the present invention, in order to overcome this issue, the confidence of the motion estimation is characterized with a covariance term and the new LKF technique has been developed by the present inventors to perform covariance-based filtering over the motion field. Note that $\widehat{\delta v}$ is the minimum-mean-square-error (MMSE) estimate of $\delta v$ in the least square formulation:

$$\operatorname{argmin}_{\delta v} \|A \delta v - b\|^2. \tag{5}$$

According to estimation theory, the covariance of this estimate can be written as:

$$C(\widehat{\delta v}) = (A^T A)^{-1} \operatorname{VAR}(b) \tag{6}$$

$$\operatorname{VAR}(b) = \frac{1}{n-3} \sum_{x_i \in R(x)} \|I_t(x_i) - I_{m,w}(x_i)\|^2. \tag{7}$$

In estimation theory, the uncertainty of an estimate is characterized by its covariance. Unreliable motion estimation has a covariance matrix with large eigenvalues, which occurs in homogenous image regions with lack of textures. To enforce global smoothness and consistency over the motion field, a robust fusion technique is used to smooth out the initial motion field calculated using the Lucas-Kanade algorithm.

Assuming that the initial displacement vectors $\widehat{\delta \mathbf{v}}(x)$ and the associated covariance matrices $C(\widehat{\delta \mathbf{v}}(x))$ have been calculated using Equations (4) and (6), the fusion technique performs a covariance-weighted spatial filtering on the motion field as follows, where the initial estimates of the motion vectors are weighted according to their reliability:

$$\widetilde{\widehat{\delta \mathbf{v}}}(x) = \left[\sum_{x_i} C^{-1}(\widehat{\delta \mathbf{v}}(x_i))\right]^{-1} \sum_{x_i} [C^{-1}(\widehat{\delta \mathbf{v}}(x_i))\widehat{\delta \mathbf{v}}(x_i)] \quad (8)$$

where $\{x_i\}$ are local estimates of x. As Equation (8) indicates, the covariance-based filtering imposes lower weights on motion estimates with large uncertainty and higher weights on motion estimates with small uncertainty. This procedure effectively removes outliers and unreliable motion vectors in the initial motion field and improves the smoothness and spatial consistency of the resulting motion field.

Figure 5:
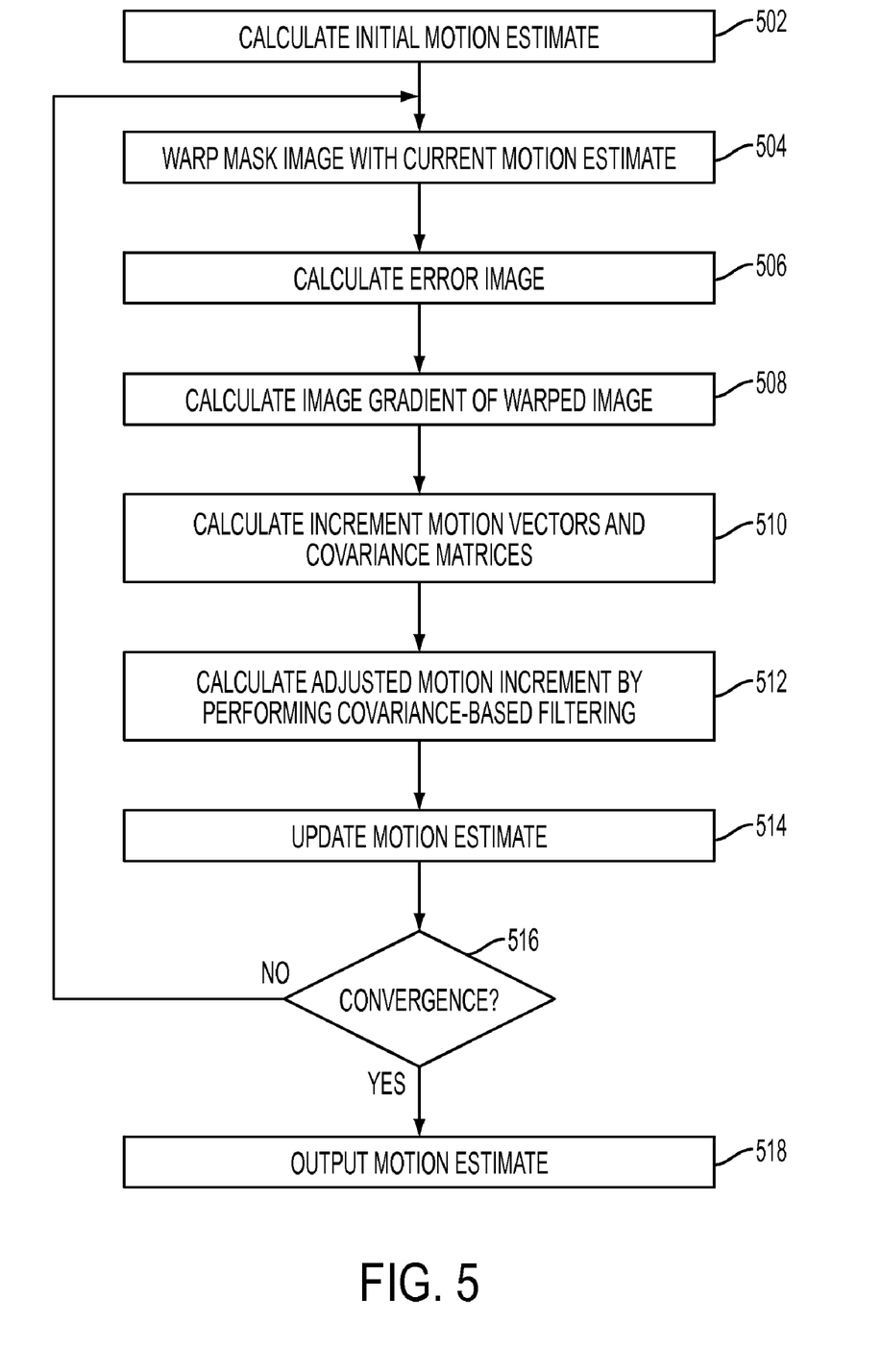
FIG. 5 illustrates the LKF method for estimating motion between a mask image and the background region of the contrast image according to an embodiment of the present invention.

FIG. 5 illustrates the LKF method for estimating motion between a mask image and the background region of the contrast image according to an embodiment of the present invention. Accordingly, the method of FIG. 5 can be used to implement step 108 of FIG. 1. Only pixels in the background region of the contrast image $I_t$ are used in the calculations performed in the steps of the method of FIG. 5. As illustrated in FIG. 5, at step 502, an initial motion estimate $\hat{v}$ is calculated. As described above, the initial motion estimate $\hat{v}$ is calculated based on image gradients as expressed in Equation (4). At step 504, the mask image $I_m$ is warped with the current motion estimation $\hat{v}$ to obtain $I_{m,w}$. At step 506, the error image $I_t - I_{m,w}$ is calculated. Since only pixels in the background region of the contrast image are used, the error image is the difference between the background of the contrast image and the mask image. At step 508, the image gradient of the warped image $\nabla_x I_{m,w}$ is calculated. At step 510, increment motion vectors $\widehat{\delta \mathbf{v}}$ and the covariance matrices $C(\widehat{\delta \mathbf{v}})$ are calculates for the warped image $I_{m,w}$ using Equations (4) and (6), respectively. At step 512, covariance based filtering is performed on the motion field to obtain and adjusted motion increment vector $\widetilde{\widehat{\delta \mathbf{v}}}$. For example, $\widetilde{\widehat{\delta \mathbf{v}}}$ is calculated using Equation (8) as described above. At step 514, the motion estimate $\hat{v}$ is updated based on the adjusted motion increment vector $\widetilde{\widehat{\delta \mathbf{v}}}$, such that $\hat{v}:=\hat{v}+\widetilde{\widehat{\delta \mathbf{v}}}$. At step 516, it is determined if the method has converged. According to possible implementations the method can converge when the incremental motion $\widehat{\delta \mathbf{v}}$ or the error image $I_t-I_{m,w}$ is sufficiently small (e.g. less than a certain threshold). It is also possible that only a set number of iterations is allowed, such that the method is determined to converge if the set number of iterations is reached. If the method has not converged, steps 504-516 are repeated until it is determined that the method has converged. If the method has converged, the method proceeds step 518 and outputs the current motion estimate $\hat{v}$.

The method of FIG. 5 can be implemented from a coarse scale to a fine scale using a pyramidal implementation. That is, the method of FIG. 5 is first used to estimate the motion at the top level of the pyramid, i.e., at the coarsest image scale. The result is propagated to the next finer scale, and the method of FIG. 5 is performed again to estimate an increment motion for the finer scale. Thus, the method of FIG. 5 is repeated for each resolution from coarse to fine in order to obtain the estimated motion between the mask image and the background region of the contrast image. Image 208 of FIG. 2 illustrates a motion field estimated between a mask image and the background region of contrast image 204.

Returning to FIG. 1, at step 110, the selected mask image is warped to compensate for the estimated motion between the mask image and the background region of the contrast image in order to generate an estimated background layer of the contrast image. Accordingly, once the background motion field between the background region of the contrast image and the mask image is estimated, the background layer $I_{B,t}(x)$ of the contrast image can be estimated by warping the image based the mask image, such that:

$$I_{B,t}(x) = I_m(x + \widehat{\mathbf{v}(\mathbf{x})}). \quad (9)$$

Image 210 of FIG. 2 illustrates the estimated background layer of contrast image 204.

At step 112, the coronary vessel layer is extracted from the contrast image by subtracting the estimated background layer (i.e., the warped mask image) from the contrast image. Accordingly, once the estimated background layer $I_{B,t}(x)$ is generated, the coronary layer $I_{C,t}(x)$, is generated by subtracting the motion compensated background layer, such that:

$$I_{C,t}(x) = I_t(x) - I_{B,t}(x) \quad (10)$$

Image 212 of FIG. 2 illustrates the coronary vessel layer (foreground layer) of contrast image 204.

At step 114, a coronary enhanced image is generated. Once the coronary vessel layers are extracted from the contrast image, it is possible to virtually enhance the coronary vessels in the contrast image. This is a direct clinical application of the coronary DSA method can save contrast medium and lower radiation. In order to enhance the coronary vessels, a coronary enhanced image is generated by weighting the coronary layer and combing the weighted coronary layer with the estimated background layer. This decreases the brightness of pixels in the extracted coronary vessel layer in the original contrast image, making the coronary vessels appear darker. Accordingly, an enhanced contrast image can be obtained as:

$$I_{enhanced,t}(x) = \alpha \cdot I_{C,t}(x) + I_{B,t}(x) \quad (11)$$

Image 214 of FIG. 2 shows the coronary enhanced image generated for contrast image 204.

At step 116, the extracted coronary vessel layer and the coronary enhanced image are output. The extracted coronary vessel layer can be output by Image 214 of FIG. 2 shows the coronary enhanced image generated for contrast image 204.

At step 116, the extracted coronary vessel layer and the coronary enhanced image are output. The extracted coronary vessel layer can be output by displaying the coronary vessel layer as an image on a display device. Similarly, the coronary enhanced image can be output by displaying the coronary enhance image on a display device. The coronary vessel layer and coronary enhanced image may also be output by storing the coronary vessel layer and/or the coronary enhanced image, for example, in a computer readable medium or storage or memory of a computer system.

Figure 6:
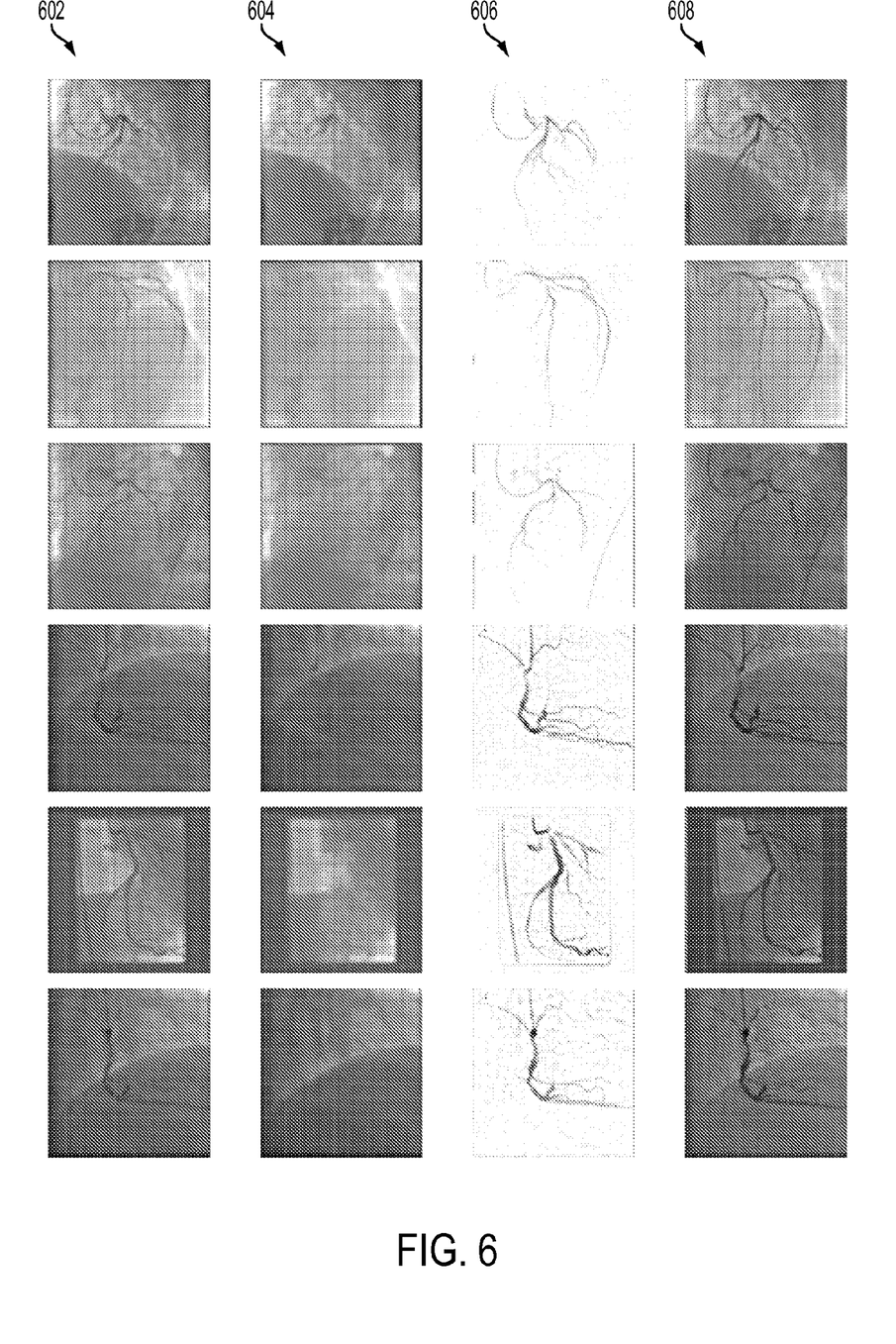
FIG. 6 illustrates exemplary results of the coronary DSA method of FIG. 1.

FIG. 6 illustrates exemplary results of the coronary DSA method of FIG. 1. As illustrated in FIG. 6, column 602 shows original contrast images, column 604 shows the corresponding motion-compensated background images, column 606 shows the corresponding coronary vessel layers extracted from contrast images 602, and column 608 shows the corresponding enhanced coronary images.

Figure 7:
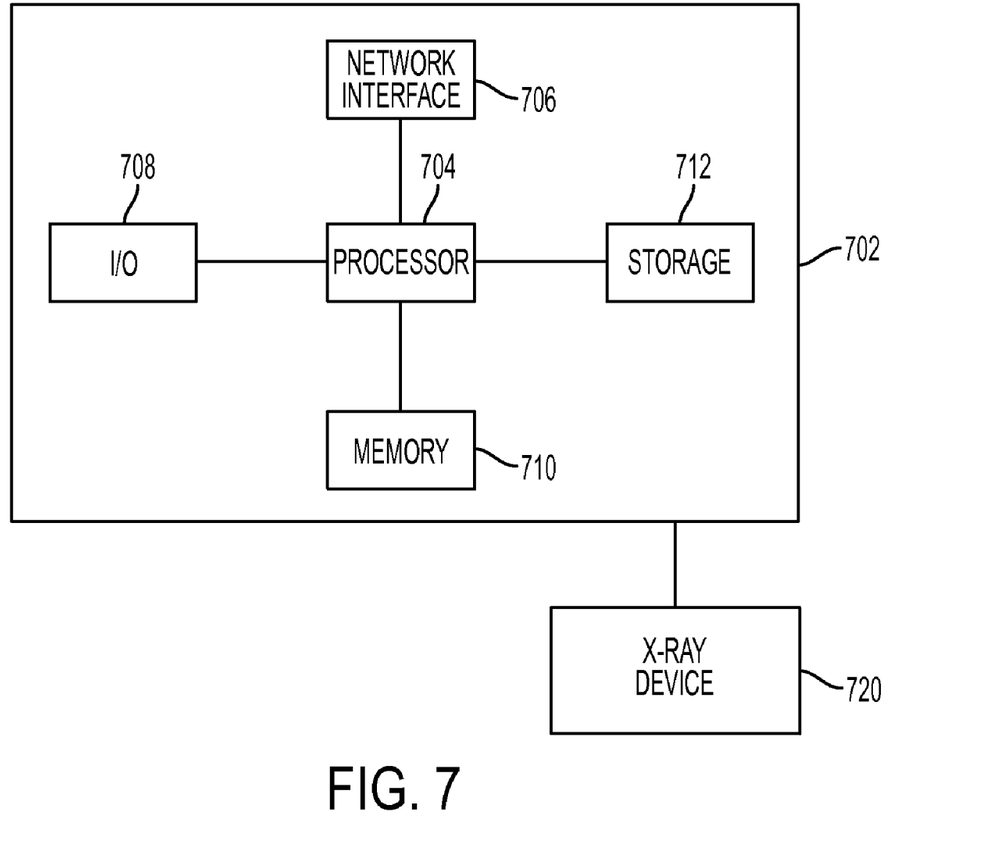
FIG. 7 is a high level block diagram of a computer capable of implementing the present invention.

The above-described methods for extracting coronary vessels from a sequence of fluoroscopic contrast images may be implemented on a computer using well-known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, applications for performing the above-described method steps of the methods of FIGS. 1 and 5 can be defined by the computer program instructions stored in the memory 710 and/or storage 712 and controlled by the processor 704 executing the computer program instructions. Furthermore, sets of mask images, sequences of contrast images, and output coronary vessel layers and background layers can be stored in the storage 712 and/or the memory 710. The computer 702 also includes one or more network interfaces 706 for communicating with other devices via a network. An X-ray device 720 can be connected to the computer 702 to input the contrast images and the mask images to the computer 702. It is possible to implement the X-ray device 720 and the computer 702 as one device. It is also possible that the X-ray device 820 and the computer 702 communicate wirelessly through a network. The computer 702 also includes other input/output devices 708 that enable user interaction with the computer 702 (e.g., display, keyboard, mouse, speakers, buttons, etc.) One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for extracting coronary vessels from a contrast image, comprising:
   receiving a plurality of mask images of a coronary region;
   receiving a contrast image of the coronary region;
   detecting vessel regions in the contrast image using learning-based vessel segment detection;
   determining a background region of the contrast image based on the detected vessel regions;
   estimating background motion between one of the plurality of mask images and the background region of the contrast image by estimating a motion field between the one of the plurality of mask images and the background image and performing covariance-based filtering over the estimated motion field;
   warping said one of the plurality of mask images based on the estimated background motion to generate an estimated background layer; and
   extracting a coronary vessel layer from the contrast image by subtracting the estimated background layer from the contrast image.

2. The method of claim 1, further comprising:
   repeating said steps of receiving a contrast image, detecting vessel regions in the contrast image, determining a background region of the contrast image, estimating background motion, warping one of the plurality of mask images, and extracting a coronary vessel layer from the contrast image for each of a sequence of contrast images.

3. The method of claim 2, wherein the coronary vessel layer for each of the sequence of contrast images is extracted in real-time as each of the sequence of contrast images is received.

4. The method of claim 1, wherein the plurality of mask images comprises a sequence of mask images of the coronary region taken over at least one full cardiac cycle.

5. The method of claim 1, wherein said step of detecting vessel regions in the contrast image comprises:
   applying a set of steerable filters to the contrast image to detect ridge features in the contrast image; and
   detecting vessel segments at the detected ridge features using a learned binary classifier.

6. The method of claim 1, wherein said step of estimating background motion between one of the plurality of mask images and the background region of the contrast image comprises:
   estimating the motion field between each mask image and the background region of the contrast image; and
   selecting one of the plurality of mask images that best matches the background region of the contrast image based on the estimated motion fields between each of the plurality of mask images and the background region of the contrast image.

7. The method of claim 1, wherein said step of estimating background motion between one of the plurality of mask images and the background region of the contrast image comprises:
   (a) estimating an initial motion field between the one of the plurality of mask images and the background region of the contrast image and covariance matrices of estimated motion vectors in the motion field;
   (b) warping the one of the plurality of mask images based on the estimated motion field;
   (c) calculating an error image between the background region of the contrast image and the warped one of the plurality of mask images;
   (d) calculating an image gradient of the warped one of the plurality of mask images;
   (e) calculating increment motion vectors based on the image gradient and covariance matrices of the increment motion vectors;
   (f) calculated adjusted increment motion vectors by filtering the motion field based on the covariance matrices; and
   (g) updating the estimated motion field based on the adjusted increment motion vectors.

8. The method of claim 7, wherein said step of estimating background motion between one of the plurality of mask images and the background region of the contrast image further comprises:
   (h) repeating steps (b)-(g) until convergence.

9. The method of claim 8, wherein said step of estimating background motion between one of the plurality of mask images and the background region of the contrast image further comprises:
   performing steps (a)-(h) for each of a plurality of scales from coarsest to finest.

10. The method of claim 1, further comprising:
    generating an enhanced coronary image by enhancing coronary vessels in the contrast image based on the extracted coronary vessel layer.

11. An apparatus for extracting coronary vessels from a contrast image, comprising:
   means for receiving a plurality of mask images of a coronary region;
   means for receiving a contrast image of the coronary region;
   means for detecting vessel regions in the contrast image using learning-based vessel segment detection;
   means for determining a background region of the contrast image based on the detected vessel regions;
   means for estimating background motion between one of the plurality of mask images and the background region of the contrast image by estimating a motion field between the one of the plurality of mask images and the background image and performing covariance-based filtering over the estimated motion field;
   means for warping said one of the plurality of mask images based on the estimated background motion to generate an estimated background layer; and
   means for extracting a coronary vessel layer from the contrast image by subtracting the estimated background layer from the contrast image.

12. The apparatus of claim 11, wherein said means for receiving a contrast image of the coronary region comprises:
   means for receiving a sequence of contrast images of the coronary region.

13. The apparatus of claim 11, wherein the plurality of mask images comprises a sequence of mask images of the coronary region taken over at least one full cardiac cycle.

14. The apparatus of claim 11, wherein said means for detecting vessel regions in the contrast image comprises:
   means for applying a set of steerable filters to the contrast image to detect ridge features in the contrast image; and
   means for detecting vessel segments at the detected ridge features using a learned binary classifier.

15. The apparatus of claim 11, wherein said means for estimating background motion between one of the plurality of mask images and the background region of the contrast image comprises:
   means for estimating the motion field between each mask image and the background region of the contrast image; and
   means for selecting one of the plurality of mask images that best matches the background region of the contrast image based on the estimated motion fields between each of the plurality of mask images and the background region of the contrast image.

16. The apparatus of claim 11, wherein said means for estimating background motion between one of the plurality of mask images and the background region of the contrast image comprises:
   means for estimating an initial motion field between the one of the plurality of mask images and the background region of the contrast image;
   means for warping the one of the plurality of mask images based on the estimated motion field;
   means for calculating an error image between the background region of the contrast image and the warped one of the plurality of mask images;
   means for calculating an image gradient of the warped one of the plurality of mask images;
   means for calculating increment motion vectors based on the image gradient and covariance matrices of the increment motion vectors;
   means for calculated adjusted increment motion vectors by filtering the motion field based on the covariance matrices; and
   means for updating the estimated motion field based on the adjusted increment motion vectors.

17. The apparatus of claim 9, further comprising:
   means for generating an enhanced coronary image by enhancing coronary vessels in the contrast image based on the extracted coronary vessel layer.

18. A non-transitory computer readable medium encoded with computer executable instructions for extracting for extracting coronary vessels from a contrast image, the computer executable instructions defining steps comprising:
   receiving a plurality of mask images of a coronary region;
   receiving a contrast image of the coronary region;
   detecting vessel regions in the contrast image using learning-based vessel segment detection;
   determining a background region of the contrast image based on the detected vessel regions;
   estimating background motion between one of the plurality of mask images and the background region of the contrast image by estimating a motion field between the one of the plurality of mask images and the background image and performing covariance-based filtering over the estimated motion field;
   warping said one of the plurality of mask images based on the estimated background motion to generate an estimated background layer; and
   extracting a coronary vessel layer from the contrast image by subtracting the estimated background layer from the contrast image.

19. The non-transitory computer readable medium of claim 18, further comprising computer executable instructions defining the step of:
   repeating said steps of receiving a contrast image, detecting vessel regions in the contrast image, determining a background region of the contrast image, estimating background motion, warping one of the plurality of mask images, and extracting a coronary vessel layer from the contrast image for each of a sequence of contrast images.

20. The non-transitory computer readable medium of claim 19, wherein the coronary vessel layer for each of the sequence of contrast images is extracted in real-time as each of sequence of contrast images is received.

21. The non-transitory computer readable medium of claim 18, wherein the plurality of mask images comprises a sequence of mask images of the coronary region taken over at least one full cardiac cycle.

22. The non-transitory computer readable medium of claim 18, wherein the computer executable instructions defining the step of detecting vessel regions in the contrast image comprise computer executable instructions defining the steps of:
   applying a set of steerable filters to the contrast image to detect ridge features in the contrast image; and
   detecting vessel segments at the detected ridge features using a learned binary classifier.

23. The non-transitory computer readable medium of claim 18, wherein the computer executable instructions defining the step of estimating background motion between one of the plurality of mask images and the background region of the contrast image comprise computer executable instructions defining the steps of:
   estimating the motion field between each mask image and the background region of the contrast image; and
   selecting one of the plurality of mask images that best matches the background region of the contrast image based on the estimated motion fields between each of the plurality of mask images and the background region of the contrast image.

24. The non-transitory computer readable medium of claim 18, wherein the computer executable instructions defining the step of estimating background motion between one of the plurality of mask images and the background region of the contrast image comprise computer executable instructions defining the steps of:
- (a) estimating an initial motion field between the one of the plurality of mask images and the background region of the contrast image and covariance matrices of estimated motion vectors in the motion field;
- (b) warping the one of the plurality of mask images based on the estimated motion field;
- (c) calculating an error image between the background region of the contrast image and the warped one of the plurality of mask images;
- (d) calculating an image gradient of the warped one of the plurality of mask images;
- (e) calculating increment motion vectors based on the image gradient and covariance matrices of the increment motion vectors;
- (f) calculated adjusted increment motion vectors by filtering the motion field based on the covariance matrices; and
- (g) updating the estimated motion field based on the adjusted increment motion vectors.

25. The non-transitory computer readable medium of claim 24, wherein the computer executable instructions defining the step of estimating background motion between one of the plurality of mask images and the background region of the contrast image further comprise computer executable instructions defining the step of:
- (h) repeating steps (b)-(g) until convergence.

26. The non-transitory computer readable medium of claim 18, wherein the computer executable instructions defining the step of estimating background motion between one of the plurality of mask images and the background region of the contrast image further comprise computer executable instructions defining the step of:
- performing steps (a)-(h) for each of a plurality of scales from coarsest to finest.

27. The non-transitory computer readable medium of claim 18, further comprising computer executable instructions defining the step of:
- generating an enhanced coronary image by enhancing coronary vessels in the contrast image based on the extracted coronary vessel layer.

* * * * *